United States Patent
Dyson et al.

(10) Patent No.: US 10,309,376 B1
(45) Date of Patent: Jun. 4, 2019

(54) ALPHA-STREAM CONVERTOR

(71) Applicant: The United States of America as represented by the Administrator of the National Aeronautics and Space Administration, Washington, DC (US)

(72) Inventors: Rodger W. Dyson, Elyria, OH (US); Geoffrey A. Bruder, Parma Heights, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 539 days.

(21) Appl. No.: 14/858,424

(22) Filed: Sep. 18, 2015

Related U.S. Application Data

(60) Continuation of application No. 14/719,885, filed on May 22, 2015, now Pat. No. 10,119,525, and a division of application No. 13/534,804, filed on Jun. 27, 2012, now Pat. No. 9,163,581.

(51) Int. Cl.
  *F02D 29/06* (2006.01)
  *F03G 7/00* (2006.01)

(52) U.S. Cl.
  CPC .................... *F03G 7/00* (2013.01)

(58) Field of Classification Search
  CPC . F02G 1/04; F02D 29/06; F02B 63/04; H02K 7/18
  See application file for complete search history.

(56) References Cited

U.S. PATENT DOCUMENTS

| | | | |
|---|---|---|---|
| 5,901,556 A | 5/1999 | Hofler | |
| 6,578,364 B2 | 6/2003 | Corey | |
| 6,868,673 B2 | 3/2005 | Weiland et al. | |
| 6,910,332 B2 | 6/2005 | Fellows | |
| 7,081,699 B2 | 7/2006 | Keolian et al. | |
| 7,772,746 B2 | 8/2010 | Keolian et al. | |
| 7,908,855 B2 | 3/2011 | Smith | |
| 7,908,856 B2 | 3/2011 | Backhaus et al. | |
| 2006/0277925 A1 | 12/2006 | Matsubara et al. | |
| 2009/0249797 A1 | 10/2009 | Backhaus et al. | |
| 2011/0023500 A1 | 2/2011 | Garner et al. | |
| 2011/0025073 A1 | 2/2011 | Garner et al. | |
| 2011/0121583 A1 | 5/2011 | Asturias et al. | |
| 2011/0162827 A1 | 7/2011 | Riley | |
| 2011/0265493 A1* | 11/2011 | Schwartz | F25B 9/145 62/6 |

* cited by examiner

*Primary Examiner* — Mark A Laurenzi
*Assistant Examiner* — Shafiq Mian
(74) *Attorney, Agent, or Firm* — Robert H. Earp, III; William M. Johnson

(57) ABSTRACT

A thermo-acoustic engine and/or cooler is provided and includes an elongated tubular body, multiple regenerators disposed within the body, multiple heat exchangers disposed within the body, where at least one heat exchanger is disposed adjacent to each of the multiple regenerators, multiple transducers axially disposed at each end of the body, and an acoustic wave source generating acoustic waves. At least one of the acoustic waves is amplified by one of the regenerators and at least another acoustic wave is amplified by a second one of regenerators.

14 Claims, 13 Drawing Sheets

ALPHA-STREAM CONVERTOR

CROSS-REFERENCE TO RELATED APPLICATIONS

This application is a Continuation and claims the benefit of U.S. Provisional Patent application Ser. No. 61/602,256 entitled "ALPHA-STREAM CONVERTOR" filed on Feb. 23, 2012. This application also claims the benefit of U.S. Non-Provisional Utility application Ser. No. 13/534,804 entitled "ALPHA-STREAM CONVERTOR" filed on Jun. 27, 2012. This application also claims the benefit of U.S. Non-Provisional Utility application Ser. No. 14/719,885 entitled "ALPHA-STREAM CONVERTOR" filed on May 22, 2015. The entirety of the above-noted application is incorporated by reference herein.

ORIGIN OF THE INVENTION

The invention described herein was made by an employee of the United States Government and may be manufactured and used only by or for the Government for Government purposes without the payment of any royalties thereon or therefore.

BACKGROUND

The challenge of converting heat energy to electricity has been addressed by numerous approaches including thermo-electric, thermophotovoltaic, thermionics, Brayton, Rankine, and Stirling based devices. The disadvantage with these devices is that, although the devices have no moving parts, they have a low efficiency. Further, the devices that have higher efficiency have moving parts, which in turn are more complex to design and build.

Others have attempted to combine thermo-acoustics with piezoelectrics to create a high efficiency device that has no moving parts. These attempts, however, still suffer from significant losses due to convective steady flows being induced in the toroidal feedback designs needed to achieve a resonant high amplitude traveling acoustic wave.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation the disclosed thermo-acoustic engine overcomes the above mentioned disadvantages by reshaping the conventional thermo-acoustic engines from a toroidal shape into a straight co-linear arrangement and recognizing that an acoustical resonance can be achieved using electronic components instead of mechanical inertance and compliance tubes. The acoustical wave that would normally travel around a toroid instead travels in a straight planar wave. Ordinarily the wave would reflect back upon reaching the end and would form a standing wave. Instead, a transducer receives the acoustical wave and electrical components modulate the signal and a second transducer on the diametrically opposed side reintroduces the acoustic wave with the correct phasing to achieve amplification and resonance. The acoustic wave is allowed to travel in a toroidal shape as before, but part of its path if handled electrically. This eliminates many of the parts and losses occurring in the current state of the art heat engines.

In another aspect of the innovation the innovation, a thermo-acoustic engine and/or cooler is provided and includes an elongated tubular body, multiple regenerators disposed within the body, multiple heat exchangers disposed within the body, where at least one heat exchanger is disposed adjacent to each of the multiple regenerators, multiple transducers axially disposed at each end of the body, and an acoustic wave source generating acoustic waves. At least one of the acoustic waves is amplified by one of the regenerators and at least another acoustic wave is amplified by a second one of regenerators.

In yet another aspect of the innovation the innovation, a thermo-acoustic engine is provided that includes an elongated tubular body, a first regenerator disposed within the body generating a first acoustic wave, a second regenerator disposed within the body generating a second acoustic wave, a first transducer axially disposed at one end of the body, and a second transducer axially disposed at an opposite end of the body. The first acoustic wave and the second acoustic wave are superimposed to form a higher amplitude acoustic wave.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
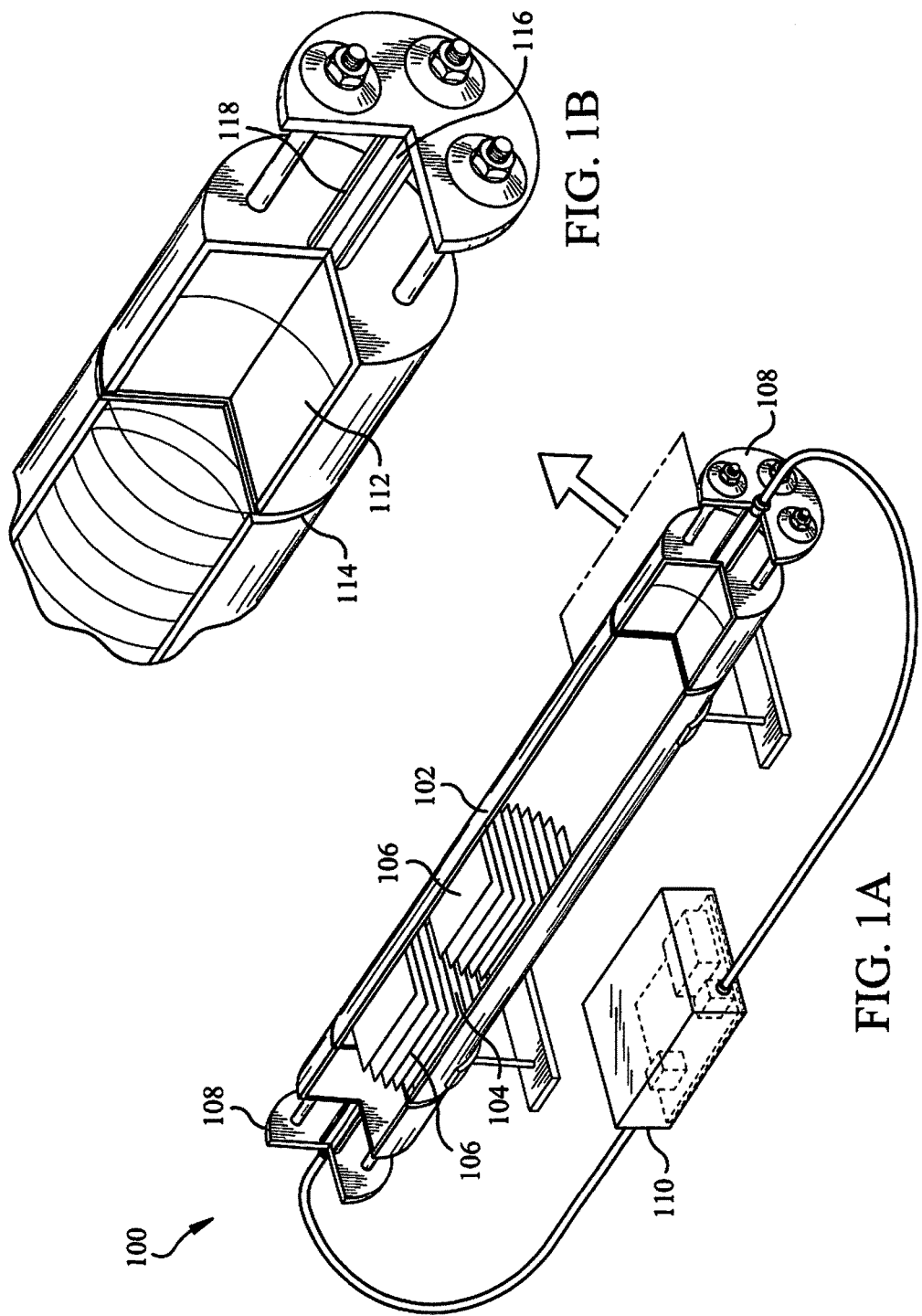
FIG. 1A is a perspective illustration of an alpha-STREAM or thermo-acoustic device that can operate as an engine or a cooler (refrigerator) in accordance with aspects of the innovation.
FIG. 1B is a close-up perspective view of one end of the device of FIG. 1 that contains an impedance matching aerogel in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring now to the figures, FIG. 1A is a perspective illustration of an alpha-STREAM or thermo-acoustic device 100 (hereinafter "device") that incorporates a Stirling cycle and can operate as an engine or a cooler (refrigerator) in accordance with aspects of the innovation. Although, Stirling engines are known for their efficiency, they are expensive to manufacture and require moving parts, which compromises the reliability of the engine. The innovation disclosed herein utilizes the Stirling cycle to provide a low cost, highly reliable, highly efficient device that requires no moving parts. The innovation also eliminates streaming losses and through specialized acoustical wave tuning allows for wide manufacturing tolerances. Still yet another benefit is that the innovation is small in size due to combining the advantages of thermo-electro-acoustics and cascaded heat exchangers with multiple wave power generation. The innovation can be used in many applications, such as but not limited to, converting heat to electrical energy, refrigeration, etc.

Still referring to FIG. 1A, the example device 100 includes an elongated tubular body 102, regenerators (or stacks) 104, heat exchangers (hot and cold) 106, transducers 108, and a tunable electrical circuit (electro-acoustic modulator) 110 that allows modulated acoustical waves to travel with periodicity from one end of the buffer tube 102 to an opposite end (or vice versa) of the buffer tube 102. The acoustical waves are converted to electrical signals and modulated appropriately while providing both external electrical energy and returning the modulated signal back to the diametrically opposing transducer. Multiple acoustic pressure waves are generated from the multiple heat exchanger/regenerator pairs. The acoustic pressure waves are phased and oriented such that they superposition either a standing or traveling wave of higher amplitude than is possible in conventional single wave engines.

A portion of the electrical energy signal is used to drive the opposing transducer with the incident acoustical wave such that the acoustical wave propagates on the side opposite as though it traversed a toroidal wave guide of proper length and phasing. This allows long wavelength signals to be carried in a short device. One key difference with the innovation disclosed herein is that the waves can travel in both directions and at any frequency without adjusting the physical length of the device. In addition, the performance of the device can be tuned electrically to maximize wave amplification at regions of interest.

The acoustical signals are converted into their electrical voltage analog and can be both phase and impedance adjusted to compensate for any transducer used. Multiple cascaded regenerators/stacks can serve to further amplify the acoustical signal and to increase the effective heat transfer area without increasing pressure vessel diameter. This technology can be operated in its thermodynamically reversed cycle as a cooler. Moreover, this device can be directly combined with a cooler either pneumatically, mechanically, or electrically to provide both power and cooling from the same device with no moving parts and small diameter.

Referring to FIG. 1B, one end of the device 100 includes an impedance layer support 112 with a protective diaphragm 114 to protect the impedance layer. Specifically, the impedance layer support 112 includes an aerogel that impedance matches a gas, such as but not limited to helium, inside the buffer tube 102 to a coil wrapped magnetostrictive stack 116, which includes permanent magnets 118.

Figure 2:
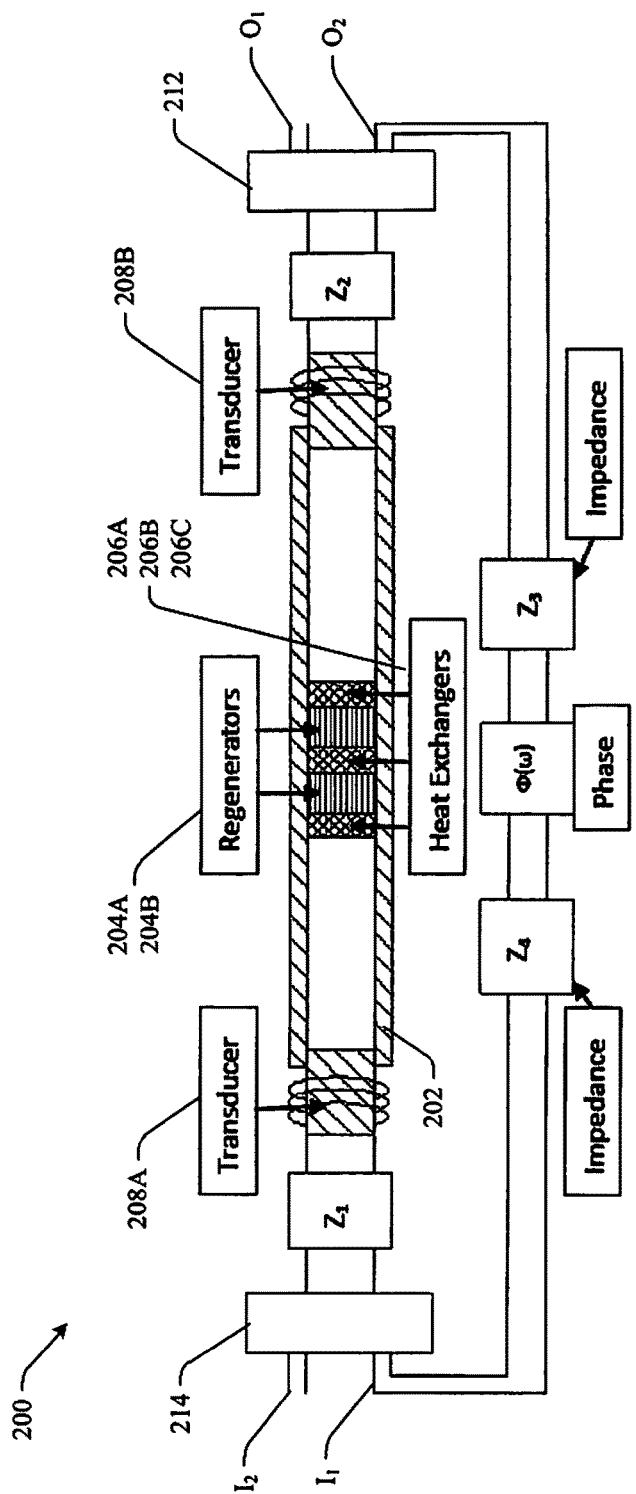
FIG. 2 is a schematic illustration of an example embodiment of a thermo-acoustic device that operates as an engine in accordance with aspects of the innovation.
Figure 5:
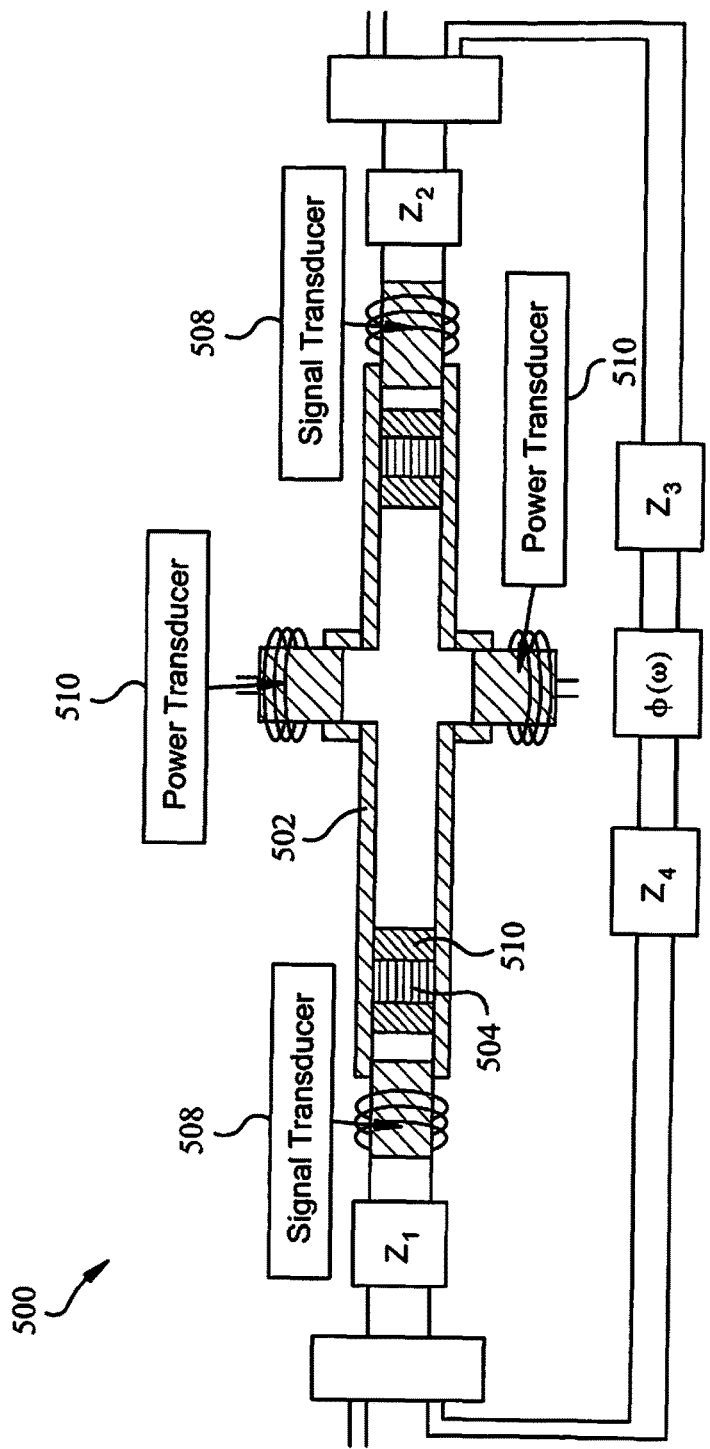
FIG. 5 is another schematic illustration of another example embodiment thermo-acoustic device that operates as an engine in accordance with aspects of the innovation.
Figure 6:
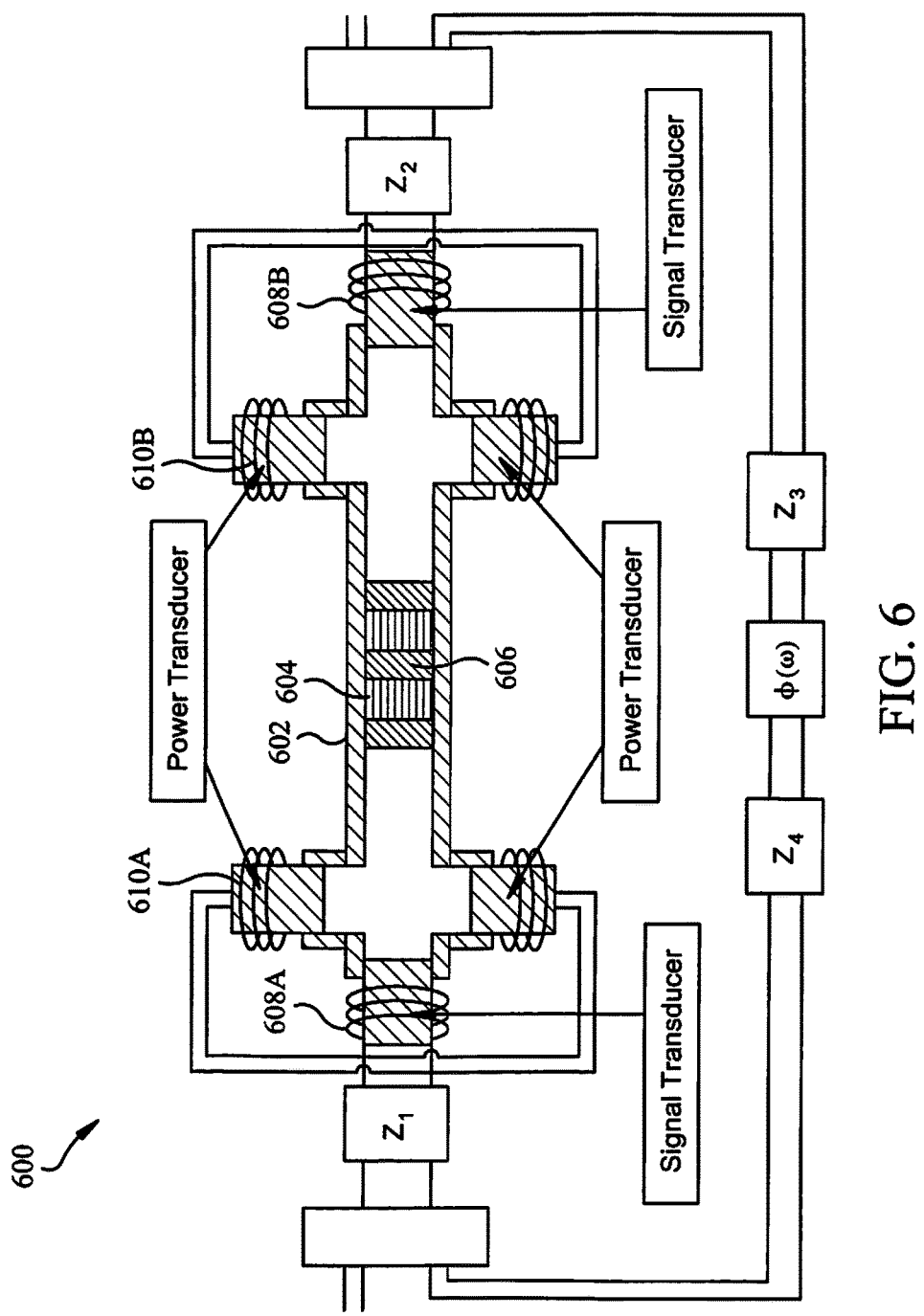
FIG. 6 is another schematic illustration of another example embodiment of a thermo-acoustic device that operates as an engine in accordance with aspects of the innovation.

FIGS. 2, 5, and 6 are example embodiments where the device acts as an engine. Specifically, FIG. 2 schematically illustrates one example embodiment of a device (engine) 200 having a standing or traveling wave configuration in accordance with aspects of the innovation. The device 200 includes an elongated tubular body 202, regenerators 204, heat exchangers 206, transducers 208, a phase delay circuit $\phi(\omega)$, and impedance circuits $Z_1$-$Z_4$.

The body 202 may be constructed from material that is generally thermally and acoustically insulative and capable of withstanding pressurization up to several atmospheres. For example, the body may be constructed from a metal, such as but not limited to, stainless steel or iron-nickel-chromium alloy.

As shown in FIG. 2, the regenerators 204 are disposed within the body 202 and include a first regenerator 204A and a second regenerator 204B. As will become evident from other example embodiments described further below, it is to be appreciated, that the number of regenerators 204 may vary depending on the application. Thus, the example embodiment shown in FIG. 2 is for illustrative purposes only and is not intended to limit the scope of the innovation. The regenerators 204 may be structured having a relatively high thermal mass but low acoustic attenuation. For example, the regenerators 204 may be constructed of a material having a structure, such as but not limited to, a wire mesh, random fiber mesh, open cell, etc. Further, the density of the material may be constant throughout the regenerator 204 or may vary for optimum efficiency.

The heat exchangers 206 are also disposed within the body 202 adjacent on each side of each regenerator 204. Thus, in the example illustrated in FIG. 2, the heat exchangers 206 include a first heat exchanger 206A, second heat exchanger 206B, and a third heat exchanger 206C. As will become evident from other example embodiments described further below, it is to be appreciated, that the number of heat exchangers 206 may vary depending on the application. The additional heat exchangers allow for more heat energy to enter without increasing the diameter of the device. This reduces hoop stresses and allows for high pressure operation.

As shown in FIG. 2, the regenerators 204 and heat exchangers 206 are disposed in the body 202 in a cascade arrangement. As mentioned above, the cascade arrangement of the regenerators 204 and heat exchangers 206 facilitate amplification of the acoustic wave and increases heat transfer without increasing the diameter of the body 202. Further, although, FIG. 2 illustrates the regenerators 204 and the heat exchangers 206 centrally located in an axial direction within the body 202, the regenerators 204 and heat exchangers 206 may be disposed at different axial locations to tailor the acoustical wave for maximum effect through the modulation of the acoustical waves.

In the example embodiment shown in FIG. 2, the transducers 208 include a first transducer 208A and a second transducer 208B. As the acoustic wave travels through the device 200, the second transducer 208B converts the acoustic wave into an electrical signal. The electrical signal travels into and out of impedance circuit $Z_2$ to a splitter 212. The splitter 212 splits the electrical signal and outputs a portion of the electrical signal, via output $O_1$ to a device external to the device 200. Another portion of the electrical signal is output, via output $O_2$, to impedance circuit $Z_3$. The electrical signal is output from impedance circuit $Z_3$ to the phase delay circuit $\phi(\omega)$, which provides the desired phasing to the electrical signal. The electrical signal is output from the phase delay circuit $\phi(\omega)$ to impedance circuit $Z_4$. The electrical signal is output from impedance circuit $Z_4$ and input, via $I_1$, to a combiner 214, where it is combined with an incoming signal via $I_2$. The combined signal is fed to impedance circuit $Z_1$ where it is ultimately fed to the first transducer 208A to thereby drive the first transducer 208A.

Figure 3:
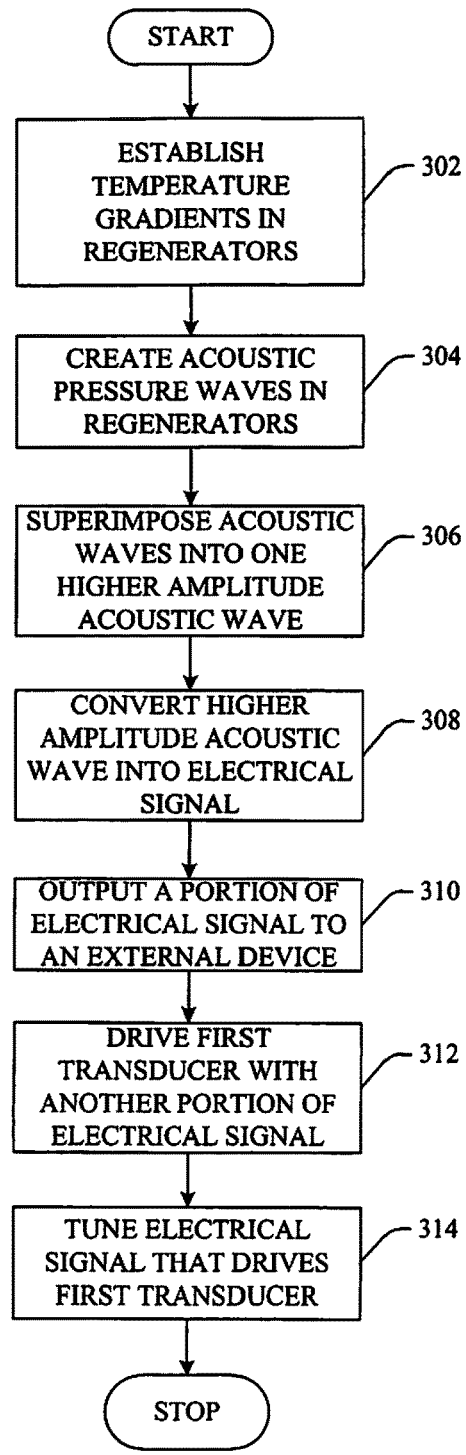
FIG. 3 is an example flow chart illustrating a method of operating the thermo-acoustic device of FIG. 2 in accordance with an aspect of the innovation.

Referring to FIG. 3, with reference to FIG. 2, the operation of the device 200 will now be described. At 302, temperature gradients are established within the body 202. Specifically, the first, second, and third heat exchangers 206A, 206B, 206C provide a temperature $T_1$, $T_2$, and $T_3$ within the tube respectively, where $T_1>T_2>T_3$ or vice versa. Thus, a decreasing (or increasing) temperature gradient is established from $T_1$ to $T_3$. In another embodiment, both the first and third heat exchangers 206A, 206C can be established as hot (or cold) heat exchangers and the second heat exchanger 206B can be established as a cold (or hot) heat exchanger. Thus, a decreasing (or increasing) temperature gradient would be established from $T_1$ to $T_2$ and from $T_3$ to $T_2$. As a result, a first temperature gradient is established in the first regenerator 204A and a second temperature gradient is established in the second regenerator 204B.

Continuing with the operation of the device 200, at 304, both the established first and second temperature gradients creates a first acoustic pressure wave in the first regenerator 204A and a second acoustic wave in the second regenerator 204B respectively. At 306, the first and second acoustic waves are superimposed to form a higher amplitude acoustic wave. At 308, the higher amplitude acoustic wave is converted into an electrical signal. At 310, a portion of the electrical signal is output to a device external to the device 200. At 312, another portion of the electrical signal is fed back into the device 200 and is used to drive the first transducer. At 314, the electrical signal, as it travels through the impedance circuits $Z_1$-$Z_4$, is tuned to a resonant frequency.

Figure 4:
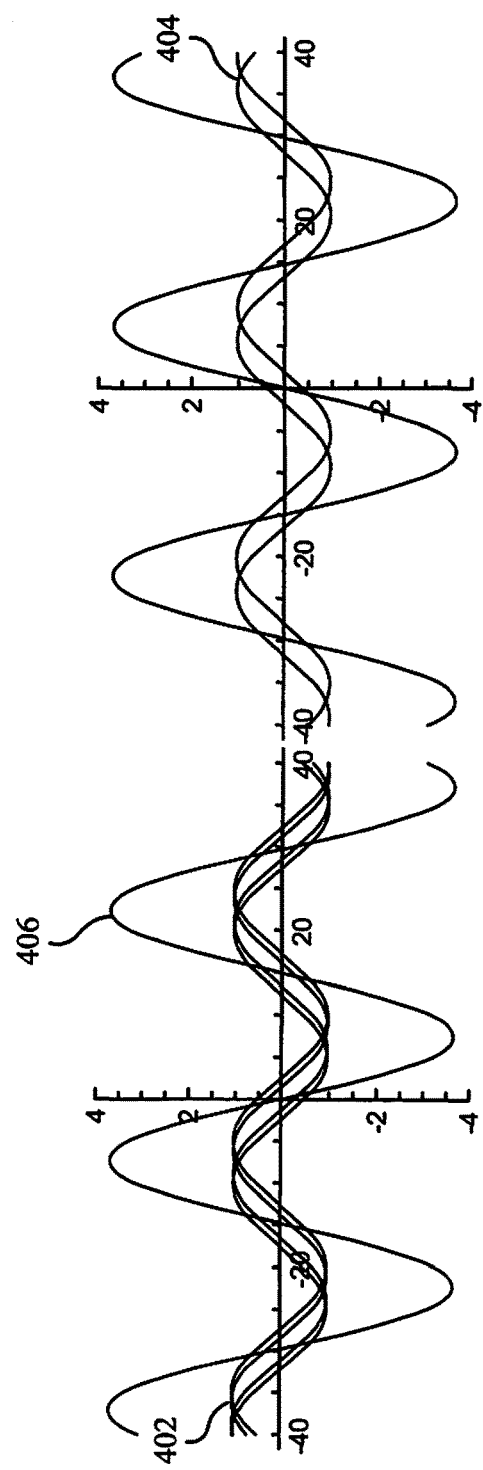
FIG. 4 is a graphical representation of two opposing traveling acoustic waves forming a higher amplitude acoustic wave in accordance with an aspect of the innovation.

Generating multiple acoustical waves traveling in the same direction in varying axial locations within the body 202 enables several benefits through wave superposition. Wave superposition produces a single amplified wave (traveling in this embodiment) having a greater amplitude than is possible with a single acoustic wave source. Further, phasing and frequency of the combined wave may be controlled to cause maximum pressure anti-nodes at one or more places. Utilizing multiple regenerators to create acoustic waves enables a high amplitude traveling wave or standing wave operation, with gains in efficiency and stability over devices with a single acoustic source that produce only Alternatively, multiple regenerators and heat exchangers may be oriented such that the generated acoustic waves travel in opposed directions. For example, referring to FIG. 4, two right traveling waves 402 and two left traveling waves 404 each having an amplitude of one combine to form a standing wave having an amplitude of four 406. As mentioned above, wave superposition produces a single amplified wave having an amplitude greater than is possible with a single acoustic wave source.

FIG. 5 is a schematic illustration of another example embodiment of a thermo-acoustic device (engine) 500 in accordance with an aspect of the innovation. The device 500 is an example standing wave configuration. The device 500 is similar to the device described above and illustrated in FIG. 2, thus, like elements will not be repeated. As in the device 200 described above, the device 500 includes a body 502, multiple regenerators 504, multiple heat exchangers 506, multiple transducers. In this embodiment, however, the regenerators 504 and heat exchangers 506 are disposed axially apart at opposite ends of the body 502. This arrangement facilitates the entering heat load to be distributed, which allows for a more compact, smaller diameter design since increased surface heat transfer area occurs axially rather than circumferentially.

In addition, the multiple transducers include multiple (i.e., two) axial signal transducers 508 disposed at each axial end of the body 502 as above, and multiple (i.e., two) vertical power transducers 510 disposed in the axial center of the body 502. One benefit to the axial signal transducers 508 is that the axial signal transducer circuit is simpler as it carries only the periodic signal. The vertical power transducers 510 extract power from the device 500.

FIG. 6 is a schematic illustration of another example embodiment of a thermo-acoustic device (engine) 600 in accordance with an aspect of the innovation. Again, like elements in the device 600 in this embodiment to those above will not be repeated. The device 600 includes a body 602, multiple regenerators 604, multiple heat exchangers 606, multiple axial signal transducers 608, and two sets of multiple vertical power transducers 610A, 610B. In this embodiment, each set of the vertical power transducers 610A, 610B are disposed at axially opposite ends of the body 602. Each transducer has a preferred impedance, operating frequency, and displacement amplitude for optimal operation and by adding more transducers the ideal operating conditions may be achieved. This enables higher frequency operation and more flexibility with vibration control. For example, multiple transducers may be used at the same pressure node in order to achieve the required volume change necessary for acoustic resonance and stability. Some transducer types have limited displacements, and would not otherwise be viable. This increases efficiency and allows for a more compact design. An additional benefit of using multiple transducers is enhanced reliability since the system may still operate in limited capacity after failure of one or more transducers.

The resonant frequency of the device and the frequency of the output can be controlled electronically and is not limited solely by the physical length of the device body. The ability to choose the locations of maximum pressure amplitude through the generation of multiple acoustical waves enables the use of varied transducer materials and designs at varying locations. This flexibility combined with a tunable electro-acoustic circuit enables the use of many kinds of transducers including traditional linear alternator, piezo-electric, electro-active polymers, and magneto-restrictive materials.

The ability to eliminate the traditional toroidal path and to convert the wave into an electrical signal allows for significant advantages. First, only the acoustical wave will travel around the loop and this eliminates the need for a jet pump and eliminates Gedeon streaming losses. Second, the ability to convert the acoustic wave into an electrical signal enables modulation of the wave using electrical components instead of physical components as is currently required. Specifically, the thermal buffer, compliance, and inertance tubes are no longer required resulting in a smaller and more efficient device. Third, the entire device now has no moving parts and the frequency of the device can be significantly increased to produce a higher efficiency device than current Stirling engines. Fourth, since the wave is now electronically tunable, manufacturing deficiencies can be tuned out and fabrication costs are significantly reduced. Fifth, the flow will only travel in a straight line through the heat exchangers reducing pressure drop while increasing overall engine efficiency. Finally, the device has a simple design that simply looks like a pipe that contains only heat exchangers. Thus, all of the complex physical components normally required for heat engines are eliminated by modulating the acoustical waves through electrical transduction and tuning.

Figure 7:
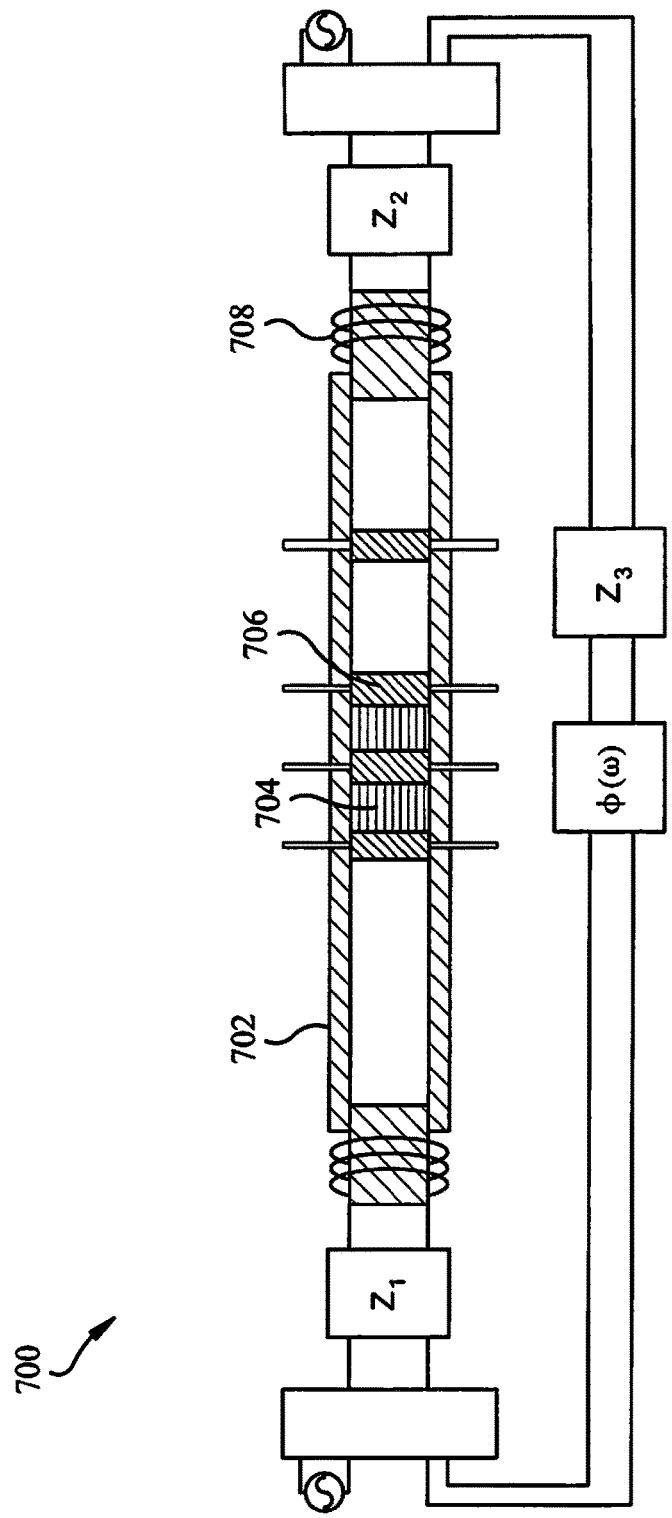
FIGS. 7-13 are schematic illustrations of example embodiments of a thermo-acoustic device that operates as a cooler in accordance with an aspect of the innovation.

FIGS. 7-13 are additional example embodiments where the alpha-STREAM concept operates in a reverse cycle and, thus, can be applied to act as a cooler (i.e., provide refrigeration). Specifically, FIG. 7, schematically illustrates one example embodiment of a device (cooler) 700 that includes an elongated tubular body 702, regenerators 704, heat exchangers 706, transducers 708, a phase delay circuit $\phi(\omega)$, and impedance circuits $Z_1$-$Z_3$. The arrangement and operation of elements that are similar to the device described above and will not be repeated.

In the example illustrated in FIG. 7, the acoustic waves are produced by one or more of the plurality of transducers 708. The transducers can be linear alternators, piezoelectric, or magnetostrictive. The high amplitude acoustic waves, due to wave superposition described above, travel through the regenerators 704 and heat exchangers 706 in such a way as to lift heat to thereby provide cooling to an external system. The other manifestations of the design are simply the device being operated in reverse with electrical power being used to create the sound waves that travel through the heat exchangers and regenerators. As above, by using multiple waves it is possible to cascade the heat exchangers for additional heat transfer area while maintaining a smaller diameter device. In addition, the construction of the cooler does not include moving parts while still maintaining high efficiency.

Figure 8:
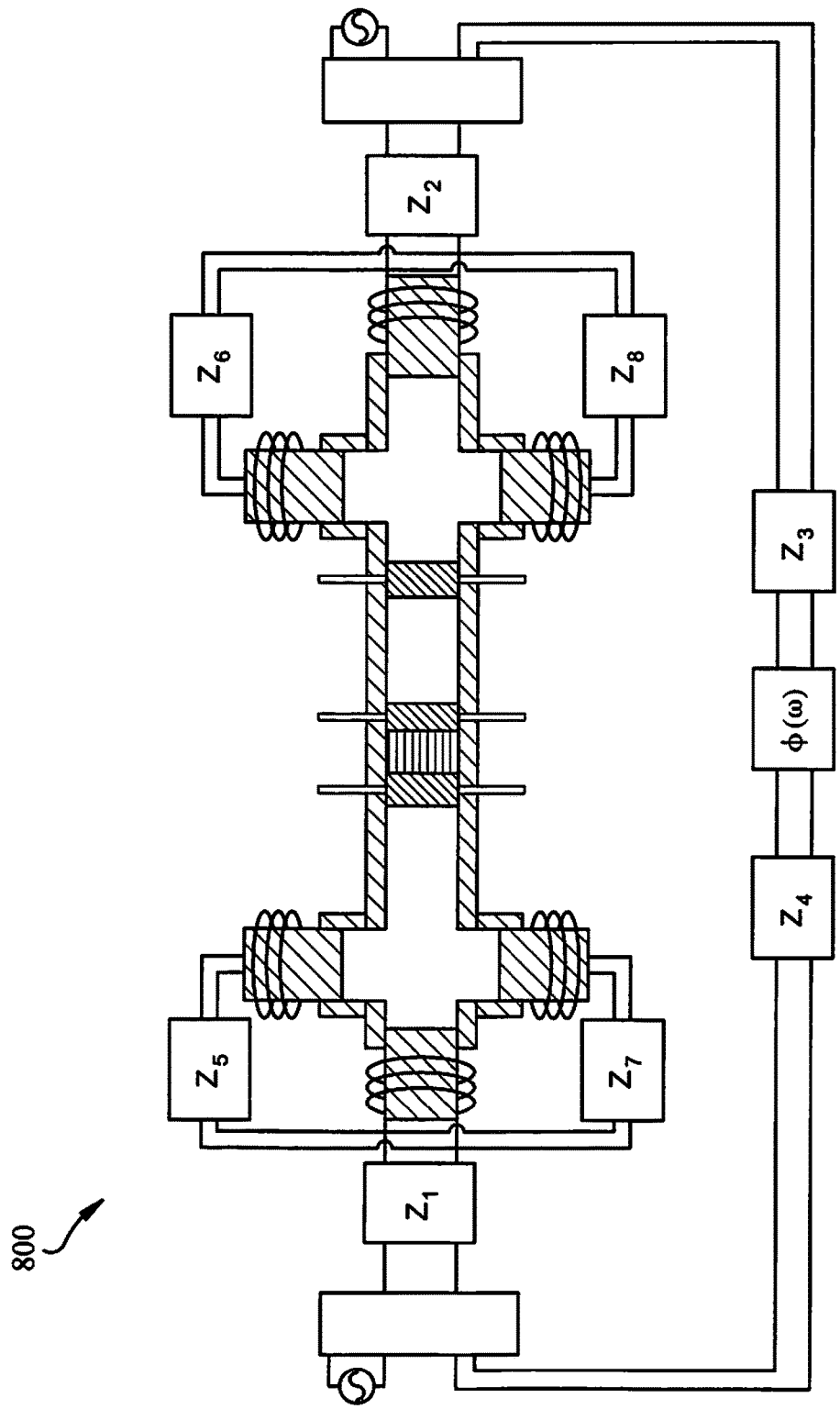
Figure 9:
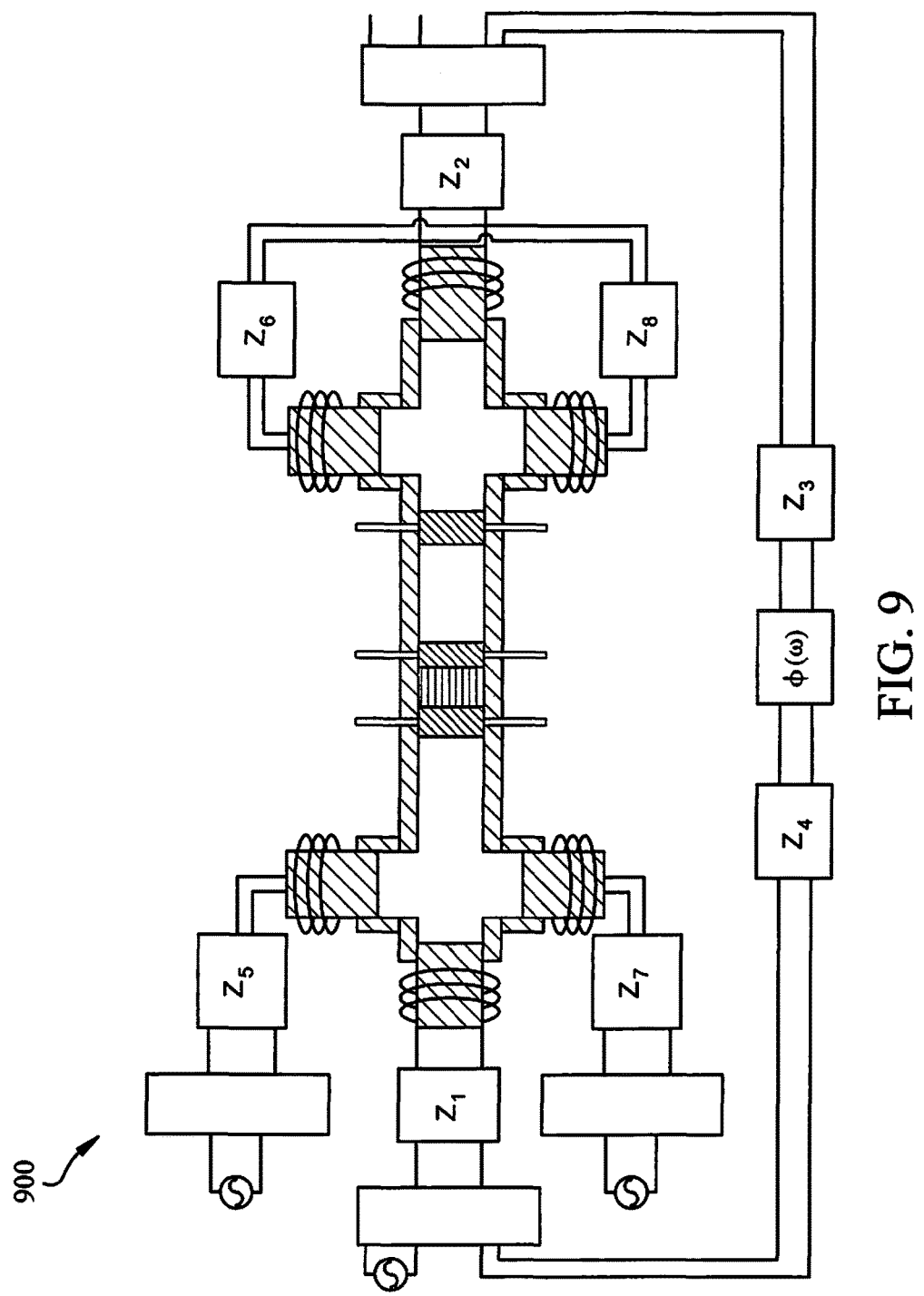

FIGS. 8 and 9 are other example embodiments of a device (cooler) 800, 900 that include multiple source/converters and multiple acoustic wave generators.

Figure 10:
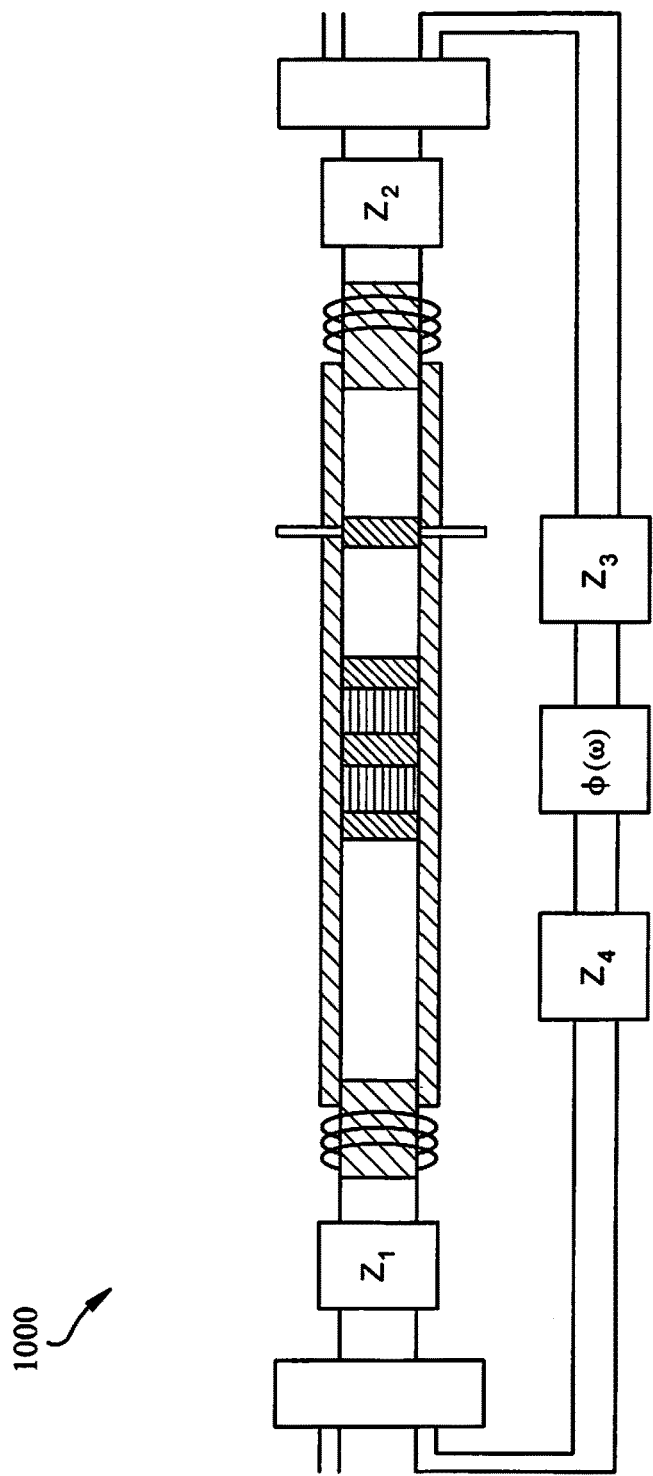
Figure 11:
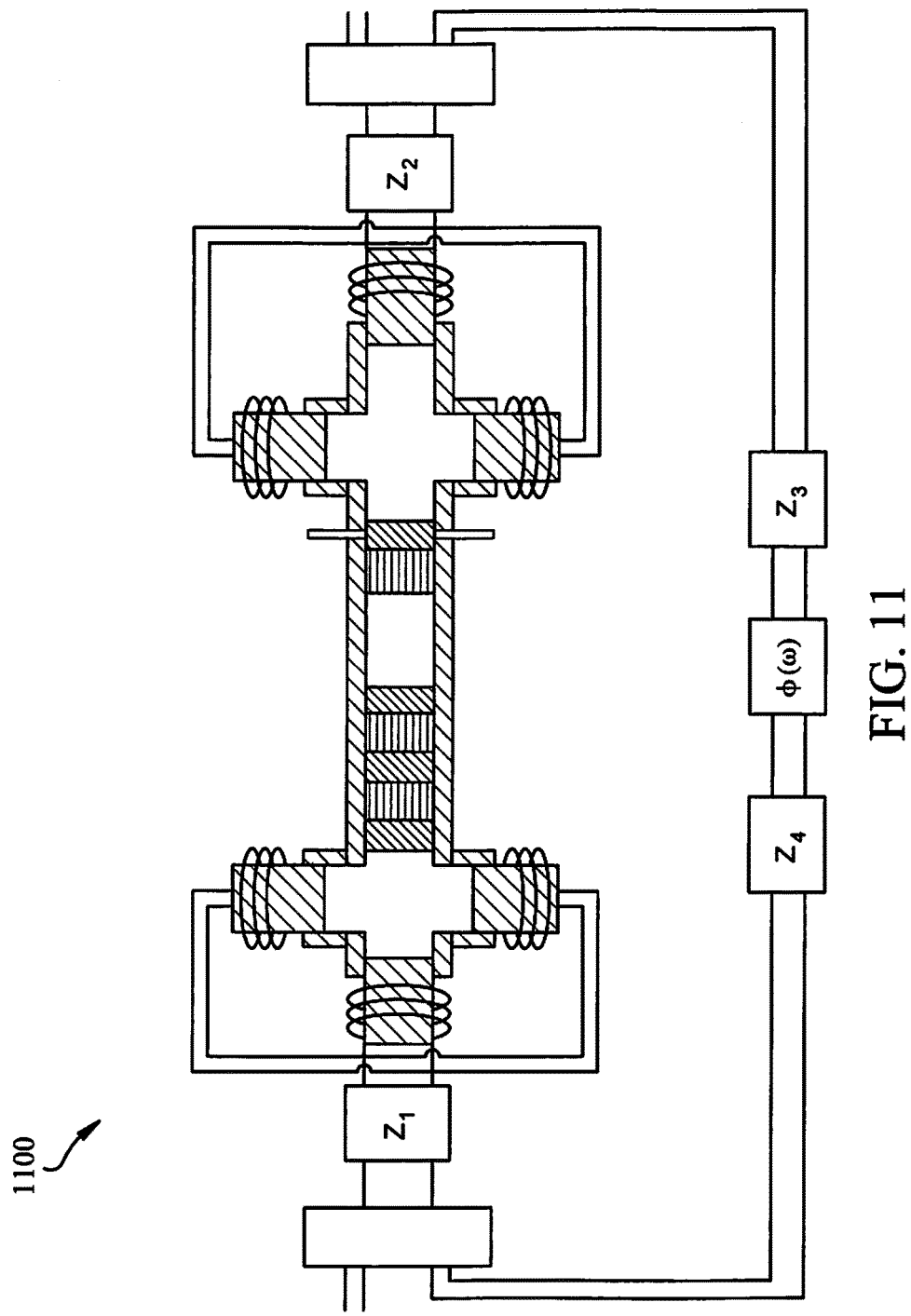

FIGS. 10 and 11 are other example embodiments of a combination device (engine/refrigerator duplex) 1000, 1100 that includes multiple sources/convertors and multiple acoustic wave generators.

Figure 12:
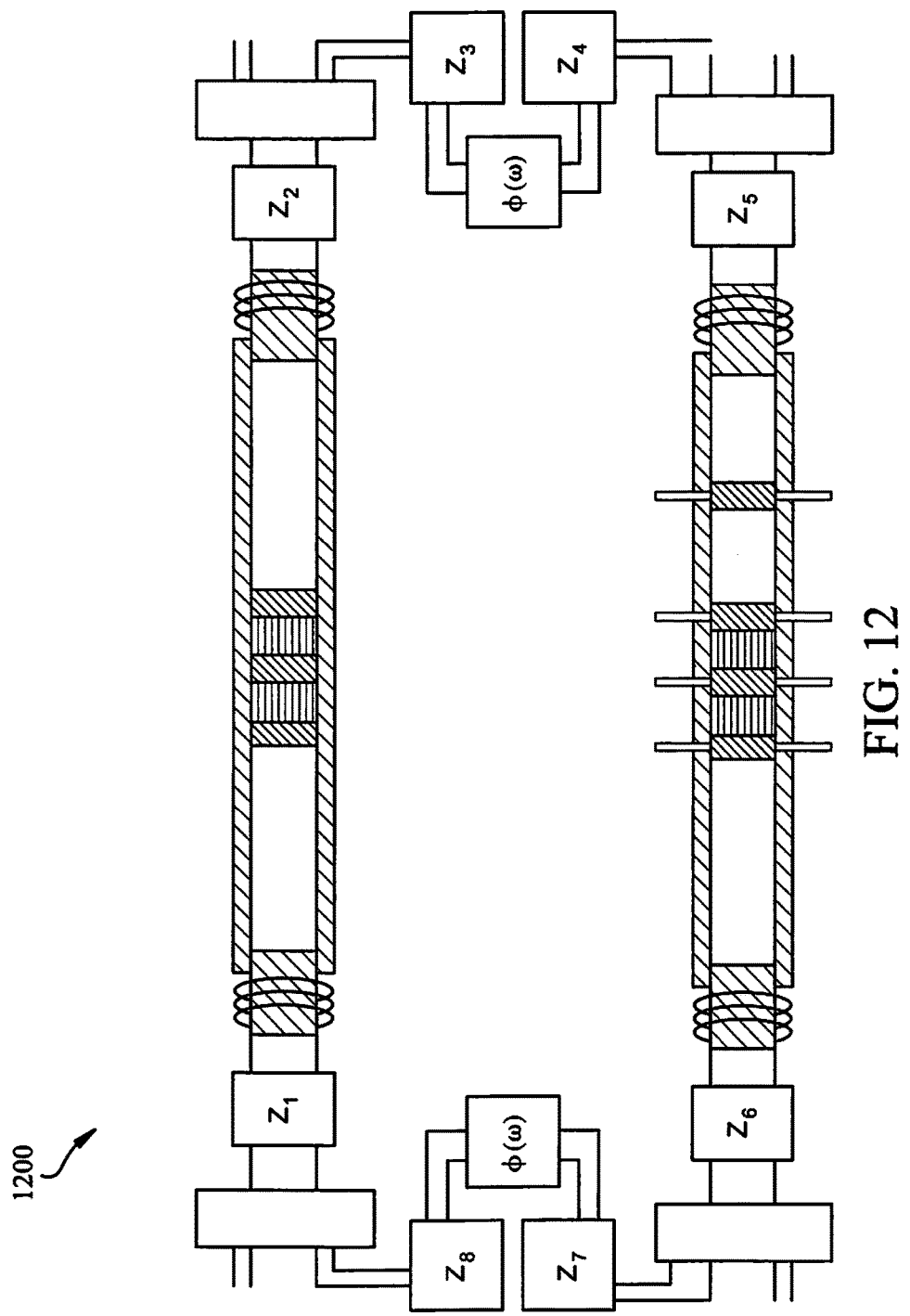
Figure 13:
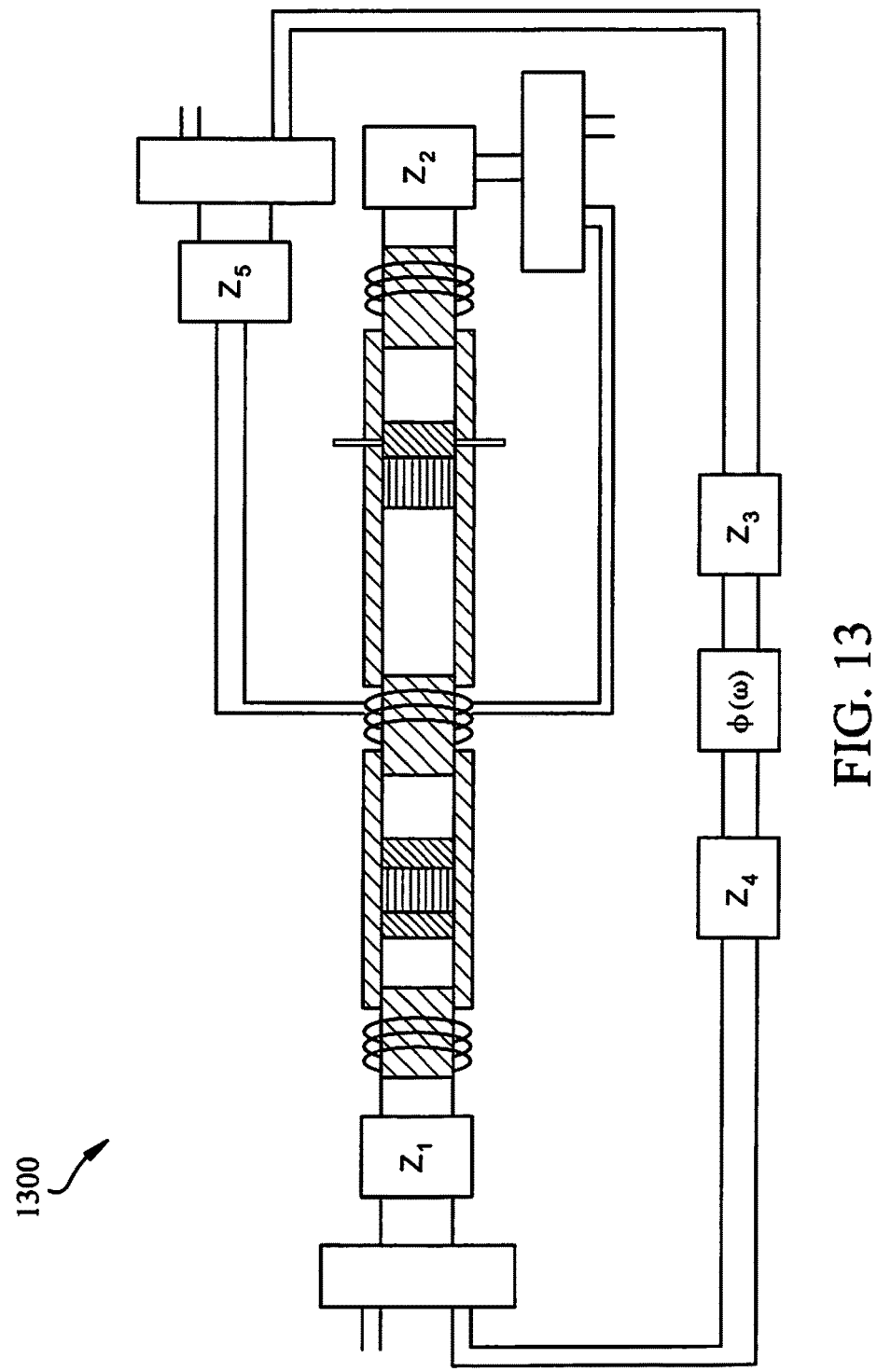

FIGS. 12 and 13 are other embodiments of an electrically combined engine/refrigerator and a mechanically combined engine/refrigerator respectively that includes multiple sources/convertors and multiple acoustic wave generators.

Key benefits to the example embodiments illustrated in FIGS. 7-13 are that all wave phasing and impedance are modulated with electronic components and not mechanical components. This eliminates the jet pump, compliance tube, thermal buffer tube, and inertance tube. In addition, multiple waves can be employed that superimpose constructively to multiply performance while maintaining a narrow tube.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A thermo-acoustic engine comprising:
an elongated body having a linear axis;
a first regenerator disposed within the body on the linear axis, the first regenerator generating a first acoustic wave;
a second regenerator disposed within the body on the linear axis, the second regenerator generating a second acoustic wave, wherein the linear axis does not curve between the first and second regenerators;
a first transducer axially disposed at one end of the body; and
a second transducer axially disposed at an opposite end of the body,
wherein the first acoustic wave and the second acoustic wave are superimposed to form a higher amplitude acoustic wave.

2. The thermo-acoustic engine of claim 1 further comprising a first heat exchanger disposed adjacent to a side of the first regenerator.

3. The thermo-acoustic engine of claim 2 further comprising a second heat exchanger disposed adjacent to an opposite side of the first regenerator and adjacent to a side of the second regenerator.

4. The thermo-acoustic engine of claim 3 further comprising a third heat exchanger disposed adjacent to an opposite side of the second regenerator.

5. The thermo-acoustic engine of claim 4 wherein the first heat exchanger heats or cools the side of the first regenerator to a temperature greater than a temperature that the second heat exchanger heats or cools the opposite side of the first regenerator.

6. The thermo-acoustic engine of claim 5 wherein said second heat exchanger heats or cools the side of the second regenerator to a temperature greater than a temperature that the third heat exchanger heats or cools the opposite side of the second regenerator.

7. The thermo-acoustic engine of claim 4 wherein the first heat exchanger and the third heat exchanger are hot heat exchangers.

8. The thermo-acoustic engine of claim 7 wherein the second heat exchanger is a cold heat exchanger.

9. The thermo-acoustic engine of claim 1 further comprising at least one signal transducer disposed within the body.

10. The thermo-acoustic engine of claim 1 further comprising at least one power transducer disposed within the body.

11. The thermo-acoustic engine of claim 10 further comprising at least one power transducer axially disposed at each end of the body.

12. The thermo-acoustic engine of claim 6, wherein the first regenerator directly contacts the first and second heat exchangers.

13. The thermo-acoustic engine of claim 12, wherein the second regenerator directly contacts the second and third heat exchangers such that the first heat exchanger, the first regenerator, the second heat exchanger, the second regenerator, and the third heat exchanger form a continuous body centered about the linear axis.

14. The thermo-acoustic engine of claim 13, wherein the continuous body is centered between the one end and the opposite end.

\* \* \* \* \*